Oct. 20, 1964 E. GANITTA ETAL 3,153,703

TRANSISTORIZED TELEPHONE SUBSETS

Filed July 15, 1960

INVENTORS
EUGEN GANITTA
AND GEORG VOGEL

BY Matthew M. Russo

ATTORNEY

United States Patent Office 3,153,703

Patented Oct. 20, 1964

3,153,703

TRANSISTORIZED TELEPHONE SUBSETS

Eugen Ganitta, Kornwestheim, Stuttgart, and Georg Vogel, Ludwigsburg, Germany, assignors to International Standard Electric Corporation, New York, N.Y., a corporation of Delaware Filed July 15, 1960, Ser. No. 43,217
Claims priority, application Germany, Aug. 4, 1959, St 15,425
4 Claims. (Cl. 179—84)

Figures 1, 2:
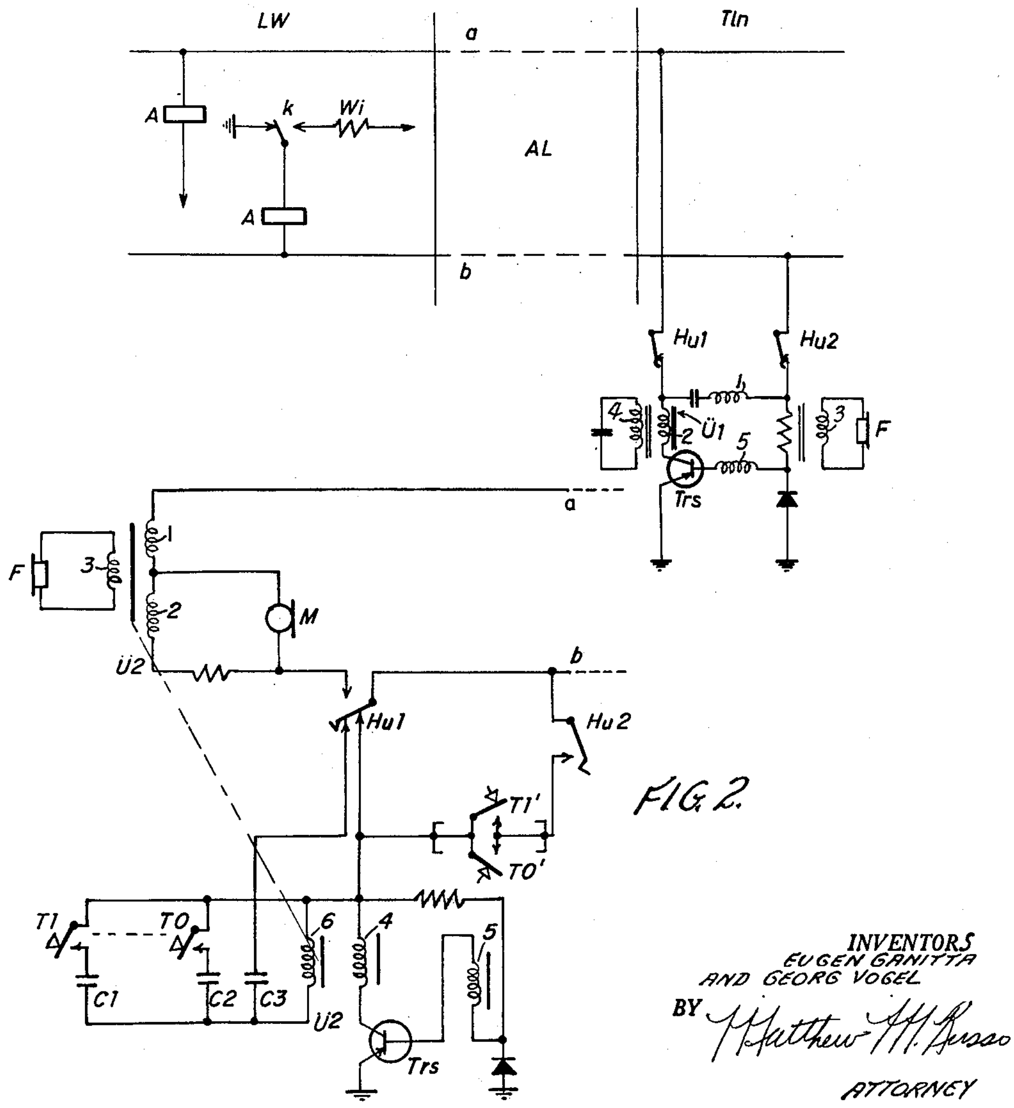

This invention relates to a circuit arrangement for subscribers' stations provided with facilities to produce the ringing alternating current. In telephone switching systems means are known to control the establishment of a connection between two subscribers' stations either directly or indirectly. According to the call-number dial pulses as transmitted by the calling subscriber the connection is established to the wanted subscriber via the transmission lines of the trunk and local facilities. In the case of an indirect dialling, the call number of the wanted subscriber, as transmitted by the calling subscriber, is stored in a register, from where the establishment of the connection to the wanted or called subscriber is then carried out automatically. As soon as the establishment of the connection has been carried out to the last switching stage, a release of the central register is effected as well as a calling of the wanted subscrbier.

In conventional arrangements of this kind the calling of the subscriber is effected from the exchange via the subscribers' lines by an alternating current with the frequency of 25 cycles. This frequency causes the sounding of the electric bell at the called substation. However, it is also known to transmit an audio-frequency (voice-frequency) call signal, and to use either the telephone or the microphone at the substation as the sound generator for the calling signal, instead of the electric bell. Together with the transmission of the call to the subscriber's station, a so-called backward signal is retransmitted in the course of establishing the connection. By means of this backward (or return) signal it is possible to release the most various switching operations in the exchange equipment. For example, it is possible in this way to effect the disconnection of a register controlling the establishment of the connection.

Usually the transmission of the backward signal is effected by means of direct current from one transmission section to the other. In the course of this the backward signal is converted and is correspondingly reformed. On the other hand, of course, also each transmission section may be provided with a signalling system or technique of its own. Also in these cases a corresponding conversion appears to be necessary. Furthermore, it is known to retransmit a special audio-frequency signal directly from the destination exchange (called destination) to the originating office or exchange without being converted, in order to initiate either the release of the register, or other switching operations. To this end, a special generator is provided in the last switching stage of the exchange for generating and transmitting the backward signal.

The conventional arrangements have the disadvantage that the last switching stage of course transmits a backward signal, but it may happen that the call is prevented for some reasons or other from reaching the subscriber's station, for example, on account of a wire-break on the subscriber's line.

It is one object of this invention to avoid these disadvantages. The invention is based on the fact that it is know per se to arrange a transistor circuit in the subscriber's station, which is supplied with the operating voltage from the central battery via the subscriber's line. According to the invention the transistor circuit, in dependency upon the operating condition of the subscriber's station as indicated by the position of the cradle-switch contact, is either controlled locally in the manner known per se as an oscillator for generating the frequencies required for carrying out the dialling process, and/or as a microphone amplifier, or otherwise the transistor circuit is remotely controlled as an oscillator from the exchange via the subscriber's line, in which case the produced frequency is fed on the one hand as the call to the sound generator of the subscriber's station and, on the other hand, is transmitted backwards as an operating signal to the switching equipment of the exchange. This backward-transmitted operating signal, for example, may cause the disconnection of the register which serves the establishment of the connection. However, it is also possible to use it for various other purposes. In any case, however, it is safeguarded that such a backward-transmitted operating signal is only transmitted if the call has actually reached the subscriber's station. In this way a genuine return indication is ensured. According to the further embodiment of the invention the telephone is used as the sound generator at the subscriber's station. For the transmission of the calling frequency both to the telephone and via the subscriber's line it is of advantage to use the speech transformer of the station.

The invention will be explained by reference to the examples of embodiment shown in FIGS. 1 and 2 of the accompanying drawings. In these drawings only those circuits of both the subscriber's station and the final selector stage are shown which are absolutely necessary to understand the invention.

If, according to the example of FIG. 1, in a conventional but not particularly shown manner, a connection is established from the originating exchange, via several connecting stages, to the final selector stage of a terminating exchange then, in order to effect the calling of the subscriber, the contact *k* is reversed in the conventional, but likewise not particularly shown manner. On account of this the negative potential of the central battery is applied, via the two windings of the relay A, and via a resistor W*i*, to both line conductors *a* and *b* of the subscriber's line AL. An account of this the oscillator, arranged at the subscriber's station T*ln*, is supplied with the necessary control voltage, and is excited to perform its oscillation. This oscillator consists of a transistor T*rs*, in whose collector circuit the winding 2 of the speech transformer U*l* is arranged. The resistor of the telephone F is utilized as an operating resistance for the feedback purpose. The remaining part of the oscillator is embodied in the conventional manner, and is not described in detail herein.

As already mentioned in the foregoing, the oscillator is excited to perform its oscillation by the application of the control voltage. The generated frequency is determined by the oscillating circuit which is constituted by the winding 4 of the transformer U1. This frequency, for example of 1000 cycles, is fed on the one hand, via the winding 3 of the transformer U1, to the telephone F, from where it is radiated as the call signal. On the other hand, the frequency is applied via the winding 1 of the transformer U1, to the subscriber's line AL and, under certain circumstances, is retransmitted from there to the originating exchange where it is used to initiate the necessary switching operations, such as the disconnection of the register. Subsequently to the lifting of the receiver or handset the hook or cradle switch is actuated in the conventional manner. The contacts H*u*1 and H*u*2 thereof are opened and disconnect the oscillator from the central battery. By reversing the cradle-switch contact both the speech transformer U1 and the telephone F are disconnected, and, in a manner not described particularly hereinafter, the arrangement can either be used for the telephone traffic or for the audio-frequency dialling purpose in the outgoing direction.

The example of embodiment shown in FIG. 2 only shows the arrangement at the subscriber's station. The arrangement at the exchange is the same as in the case of FIG. 1. This example of embodiment shows the multiple use of the transistor circuit and the switching-over thereof in dependency upon the position of the cradle-switch contact. The position of the cradle-switch contact serves to indicate the operating condition of the subscriber's station. If the telephone station is in the normal condition, hence when the handset or receiver is not lifted, then the cradle-switch contacts H*u*1 and H*u*2 are in the position as shown in the drawing. In this case the transistor arrangement can be remotely controlled from the exchange as an oscillator for generating the calling frequency. However, if the handset or receiver is lifted, with the station then being in the operating or speaking condition, the transistor circuit is switched-over in a way that it can be locally controlled, and serves to generate the frequencies necessary for performing the dialing operation.

It is now assumed that the station is in the normal condition, i.e. the receiver or handset is replaced. If now, at the exchange, a negative potential is applied to the *b*-conductor of the subscriber's line as shown in FIG. 1, then the transistor circuit starts to oscillate. The frequency is determined by the winding 6 of the transformer U2, and by the capacitor C3 which is connected by the cradle-switch contact H*u*1. The calling signal is transferred, via the winding 3 of the transformer U2, to the telephone F, from where it is radiated. The audio-frequency operating signal is transmitted backwards over the *b*-conductor of the subscriber's line. Of course, it is also possible to couple the backward operating signal to the subscriber's line in different ways.

If the receiver is lifted in order to establish an outgoing connection, then the subscriber's loop is closed by the contact H*u*1 of the cradle switch. The operating voltage for the transistor circuit is then applied via the contact H*u*2. For the transmission of the dial information the buttons T1 . . . T0 are provided at the station in the conventional manner, by which the different capacitors, such as C1, C2 either individually or in combination, are interconnected in the oscillating circuit formed by the winding 6 of the transformer U2. Accordingly, quite depending on the buttons which are operated, various frequencies are produced for the dial information. For example, four capacitors may be provided, the capacity values of which are staggered in accordance with the steps 1, 2, 4 and 7. In this way, and by combining each time one or two capacitors, it is possible to generate ten different frequencies for representing the ten digits for the dial numbers. The operating voltage for the transistor circuit is applied via the respective button contacts T1′ . . . T0′ upon actuating the corresponding buttons. The produced dial frequencies are applied to the subscriber's line via the windings 1 and 2 of the transformer U2, and in the course of this (if so required) the receiver of the handset is disconnected.

The transistor arrangement may also be switched over to act as a microphone amplifier. The double utilization, and the switching-over from acting as an oscillator to act as an amplifier is known per se, and does not need to be described in detail herein. Of course, it is also possible to utilize the usual 25-cycle ringing signal in telephone systems to control the transistor circuit at the subscriber's station. The 25-cycle alternating voltage is then received at the subscriber's station, is rectified, and used as a control voltage for the transistor circuit. This has the advantage that in times of transition, when stations with the hitherto conventional 25-cycle ringing signal, as well as also modern types of electronic stations are connected in a telephone system, first of all the calling signal is transmitted by the exchange in the conventional manner with a frequency of 25 cycles. An electronic subscriber's station will only be recognized as such by the reception of the backward or return signal. This backward operating signal, under certain circumstances, may then be evaluated in such a way that the power supply at the exchange is automatically switched over to the value which is necessary for operating electronic systems. Of course, it is also possible to evaluate the operating signal in a different way for identifying the called subscriber, and to provide different frequencies or frequency combinations to this end, which then may be firmly adjusted at the station in accordance with the kind and classification (restriction) of the subscriber.

It is also easily possible to provide two transistor circuits at the subscriber's station, in order to carry out therewith a frequency dialling or selection with two out of five frequencies. The use of the circuit arrangement for the calling of subscribers is not affected thereby.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. A transistorized telephone subset for establishing telephone calls by transmitting voice frequency dialing signals over a line connected thereto and for receiving telephone calls by receiving voice frequency ringing signals over said line, a transmitter and a receiver for transmitting and receiving speech signals over said line, amplifier-oscillator means, hookswitch means having a first and a second position, means responsive to the said hookswitch means being in a first position for operating said amplifier-oscillator means to generate said voice-frequency dialing signals and to amplify the said speech signals and means responsive to the said hookswitch means being in a second position for operating said amplifier-oscillator means to operate the said receiver means to audibly reproduce the said ringing signals and to transmit voice-frequency ring-receipt signals over said line.

2. A transistorized telephone subset as set forth in claim 1, wherein means are provided in the said amplifier-oscillator means for responding to direct current signals received over said line for preparing said amplifier-oscillator means for operation, to transmit the said ring-receipt signals over the said line.

3. A transistorized telephone subset as set forth in claim 1 wherein speech transformer means are provided in said subset for operating the said receiver means to audibly reproduce the said ringing signals and for transmitting said ring-receipt signals over said line.

4. A transistorized telephone subset as set forth in claim 1 wherein said ring-receipt signals are of a frequency indicative of the identity of the the called subset.

References Cited in the file of this patent

UNITED STATES PATENTS

| | | |
|---|---|---|
| 2,691,073 | Lowman | Oct. 5, 1954 |
| 2,763,726 | Weller | Sept. 18, 1956 |
| 2,765,371 | Fritschi et al. | Oct. 2, 1956 |
| 2,824,174 | Holman | Feb. 18, 1958 |
| 2,825,173 | Meacham | Feb. 28, 1958 |
| 2,883,474 | Fritschi | Apr. 21, 1959 |
| 2,894,075 | Kunckel | July 7, 1959 |
| 2,967,911 | Flowers et al. | Jan. 10, 1961 |
| 2,976,369 | Salzer | Mar. 21, 1961 |